J. L. FERRIS.
AUTOMATIC VALVE.
APPLICATION FILED NOV. 5, 1921.

1,412,465.

Patented Apr. 11, 1922.

Inventor:
Jesse L. Ferris,
by Spear Middleton Donaldson & Hall
Attys.

UNITED STATES PATENT OFFICE.

JESSE L. FERRIS, OF LA CROSSE, WISCONSIN.

AUTOMATIC VALVE.

1,412,465.  Specification of Letters Patent.  Patented Apr. 11, 1922.

Application filed November 5, 1921. Serial No. 513,197.

*To all whom it may concern:*

I, JESSE L. FERRIS, a citizen of the United States, and resident of La Crosse, in the State of Wisconsin, have invented certain new and useful Improvements in Automatic Valves, of which the following is a specification.

My present invention relates to improvements in automatic valves designed to control the flow of steam through radiators and hence to automatically regulate the action thereof.

The invention aims to provide a simple form of device which may be easily and economically manufactured, may be readily applied to any ordinary valve casing; which may be easily and accurately adjusted for any desired steam pressure or temperature, and after adjustment will be sealed or closed against being tampered with and its adjustment changed by unauthorized persons.

With these and other objects in view the invention includes the novel features of construction and arrangement and combination of parts hereinafter described and particularly defined by the appended claims.

An embodiment of my invention is illustrated in the accompanying drawing in which—

Figure 1:
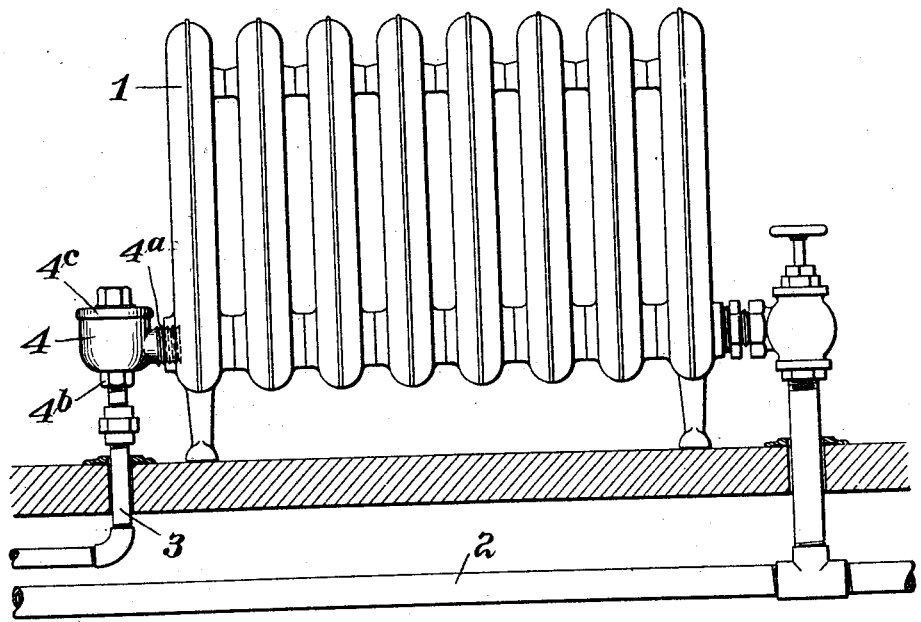
Figure 2:
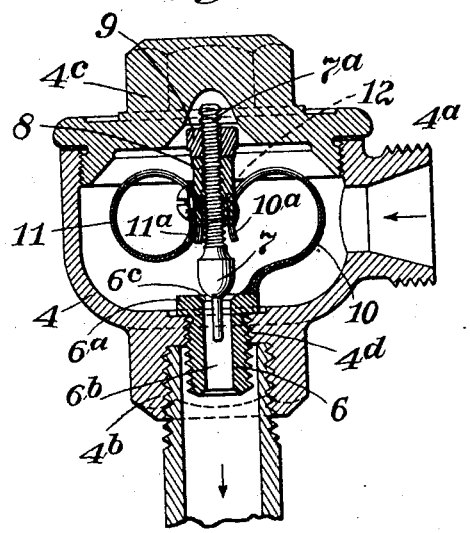
Figure 3:
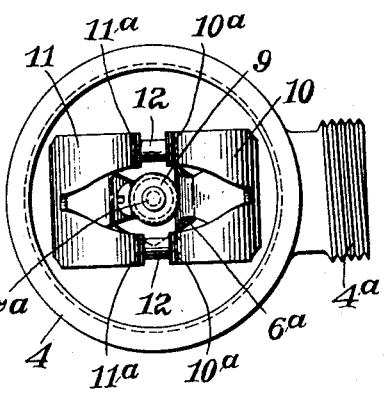

Figure 1 is a view of a steam radiator with portions of its supply and return, and Fig. 2 is a central vertical section through the valve casing taken along the line of the center of the inlet nipple $4^a$, and Fig. 3 is a plan view with the cap or cover removed.

Referring by reference characters to this drawing, the numeral 1 designates a steam radiator of the ordinary or any desired construction. 2 the steam supply pipe leading thereto from any suitable source of supply (not shown) and 3 the return pipe for water of condensation.

At 4 is shown a valve casing which is adapted for attachment to the radiator and pipe 3 respectively, being provided for this purpose with threaded nipples $4^a$ and $4^b$, and it is provided with an open top closed steam tight by a removable screw cap $4^c$. The base of the casing 4 is provided with an internal annular flange $4^d$ having its inner edge screw threaded to engage corresponding screw threads of a hollow or tubular screw plug 6 having a head $6^a$ of preferably non-circular form whereby it may be screwed into place by a suitable wrench.

This plug has its central bore or passage $6^b$ terminating at the upper end in a valve seat $6^c$ which cooperates with the thermostatic valve 7 which has a threaded shank $7^a$ passing through a correspondingly threaded recess in the valve carrying member 8 which may conveniently be formed in the shape of an internally threaded tube, a lock nut 9 being provided on the valve stem to prevent its turning in the valve carrier after adjustment. This differential action is due to the fact that member 10 is made slightly longer than member 11.

My improved thermostat comprises two thermostatic members 10 and 11 of curved leaf form. The member 10 is composed of two laminations of brass and steel with the brass on the outside and it has its lower end secured to the head $6^a$ at one side of the valve seat. The upper portion is forked to provide two downwardly turned end portions $10^a$ lying on opposite sides of the valve carrier.

The leaf member 11 is likewise made of laminations of brass and steel with the steel on the outside and it has an end secured to the valve carrier and a forked portion providing two downwardly curved arms $11^a$ juxtaposed to the arms $10^a$ and secured thereto by rivets 12.

From the foregoing description the manner of operation of my improved valve will be readily apparent, but it may be briefly stated as follows:

Supposing the valve to be in position and properly adjusted, and the radiator cold at which time the valve would be open, the admission of steam to the radiator heats the thermostat which begins to act, and causes the ends of the arms $10^a$ of member 10 to move downwardly due to the brass of member 10 being on the outside, thus carrying the rivets and ends of arms $11^a$ also downwardly or in a direction to seat the valve 7.

This action would have a tilting action on the valve and to compensate for this the member 11 is interposed with its reversely arranged laminations which, under the action of the heat, tends to move the valve carrier in the upward direction, but to a less degree but to thereby compensating the action of member 10 and preventing any misalignment of the valve.

After the valve is closed water of condensation gathering in the valve chamber will cool the thermostat which thereupon reverses its action and opens the valve.

The thermostat may be adjusted to act at any desired temperature by loosening the lock nut and turning the valve and stem to the desired degree.

Having thus described my invention, what I claim is:

1. In a thermostatic valve for the purpose described, a valve casing having a valve seat, a curved thermostatic member having one end secured to said valve seat, a second reversely acting curved thermostatic member having one end secured to the free end of said first member, and a valve adjustably carried by the free end of said second member.

2. In combination, a member having a valve seat, a valve coacting therewith, a valve carrier adjustably supporting said valve, a curved thermostatic member having one end secured to said valve member and having a forked free end and a second reversely acting curved thermostatic member having one end secured to the valve carrier and its other end forked and said forks connected to the forks of the first named member.

3. In combination, a member having a valve seat, a valve cooperating therewith having a threaded stem, a valve carrier having a bore threaded to receive said stem, a lock nut on said stem cooperating with said carrier, a curved thermostatic member having one end connected to said valve seat member, a second reversely acting thermostatic member having one end connected to said valve carrier, and means connecting the free ends of said thermostatic members.

4. In combination, a valve casing having an inlet and an outlet, a valve seat nipple threaded into the outlet of said casing, a valve coacting with said valve seat and having a threaded stem, a valve carrier having a threaded recess to receive said stem, a lock nut on said stem and thermostatic spring means connecting said valve carrier to said valve seat nipple.

5. In a thermostatic valve for the purpose described, a valve casing having a valve seat, a thermostatic member of substantially the shape of a question mark having its lower end rigidly connected with said valve seat, a second reversely acting substantially circular thermostatic member having one end rigidly connected to said first named member and a valve adjustably supported from the free end of said second thermostatic member.

6. In a thermostatic valve for the purpose described, a valve casing having a valve seat, a curved thermostatic member having one end rigidly connected with said valve seat, a second curved thermostatic member having one end rigidly connected with the free end of the first named member, said thermostatic members being composed of laminations of metals of different degrees of expansibility, the laminations of one being reversed relatively to those of the other, and a valve adjustably carried by the free end of said second member.

7. In a thermostatic valve for the purpose described, a valve casing having a valve seat, a valve, and a pair of curved thermostatic elements supporting said valve, one of said elements having one end rigidly supported and having the other end freely movable, and the other element having one end connected to the free end of said first named element, and a valve carried by the free end of the second element, said elements being reversely arranged so that their free ends move in reverse directions under temperature changes, and said elements being of different size whereby a differential movement of said ends results.

In testimony whereof, I affix my signature.

JESSE L. FERRIS.